United States Patent [19]

Yamazaki

[11] Patent Number: 4,866,944
[45] Date of Patent: Sep. 19, 1989

[54] AIR CONDITIONER SYSTEM WITH FUNCTION FOR PROTECTING ELECTRIC CIRCUIT IN OUTDOOR UNIT

[75] Inventor: Masaya Yamazaki, Fuji, Japan

[73] Assignee: Kabushiki Kaisha Toshiba, Kawasaki, Japan

[21] Appl. No.: 296,825

[22] Filed: Jan. 13, 1989

[30] Foreign Application Priority Data

Jan. 29, 1988 [JP] Japan .................................. 63-18911

[51] Int. Cl.⁴ ............................................. F25B 13/00
[52] U.S. Cl. ....................................... 62/160; 62/180; 62/228.3
[58] Field of Search .............. 62/180, 184, 160, 228.3, 62/228.4

[56] References Cited

FOREIGN PATENT DOCUMENTS 0210423 12/1983 Japan ...................................... 62/180
59-131845 7/1984 Japan .
0029853 2/1987 Japan ............................... 62/228.4
63-3220 1/1988 Japan .

Primary Examiner—William E. Wayner
Attorney, Agent, or Firm—Cushman, Darby & Cushman

[57] ABSTRACT

A refrigeration cycle has high-pressure and low-pressure refrigerant sides and causes at least a variable-capacity compressor and an outdoor heat exchanger, both of which are arranged outside the room to be air-conditioned, to communicate with an indoor heat exchanger arranged inside the room. The refrigeration cycle is operated in a heating operation mode. An inverter generates an output having a predetermined operating frequency to be supplied to the variable-capacity compressor. A fan commonly supplies an air flow to the outdoor heat exchanger and the inverter. A detector detects a signal corresponding to the pressure of the high-pressure refrigerant in the refrigeration cycle. A first control section provides a command for causing the inverter to gradually decrease the predetermined operating frequency when a detection signal from the detector exceeds a predetermined value. A second control section monitors a decrease in the predetermined operating frequency in the inverter due to the first control section, and provides a stop command to the fan when the predetermined operating frequency is decreased to a predetermined value or less.

10 Claims, 6 Drawing Sheets

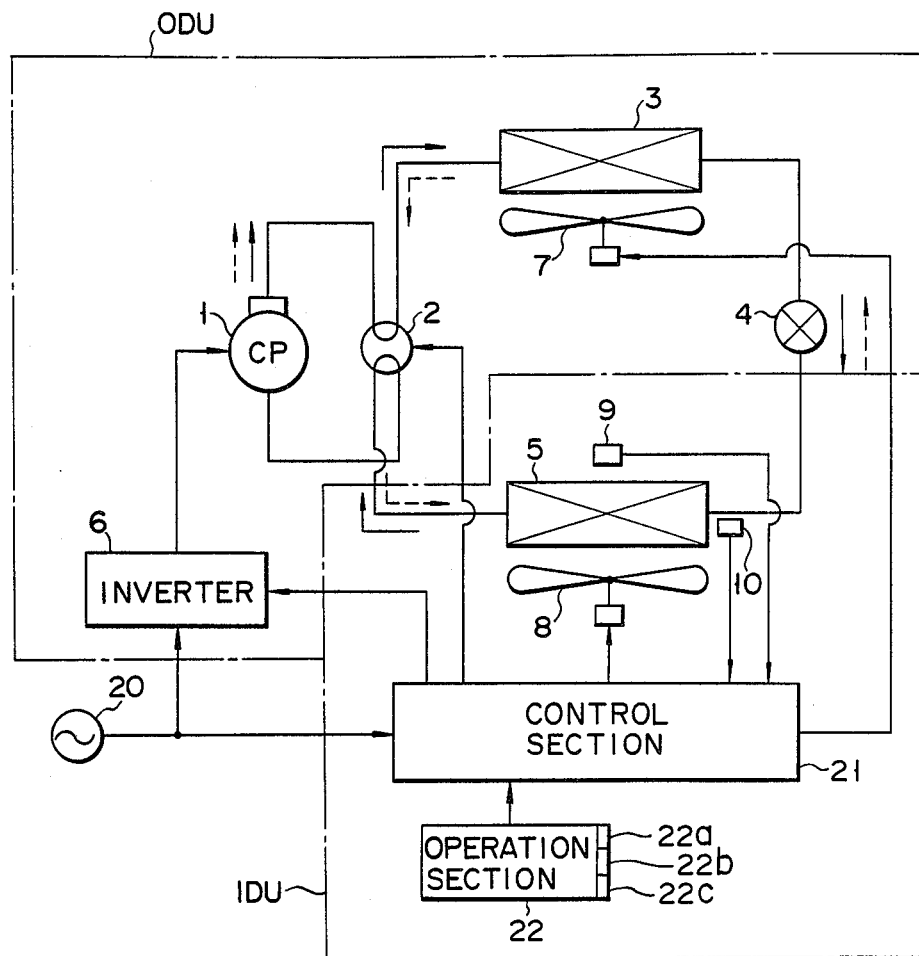
F I G. 1

4,866,944

AIR CONDITIONER SYSTEM WITH FUNCTION FOR PROTECTING ELECTRIC CIRCUIT IN OUTDOOR UNIT

BACKGROUND OF THE INVENTION

1. Field of the Invention

This invention relates to an air conditioner with a function for protecting an electric circuit in an outdoor unit and, more particularly, to an air conditioner having a high-pressure protective release function.

2. Description of the Related Art

An air conditioner comprising a heat pump type refrigeration cycle divided into indoor and outdoor units as shown in FIG. 6, and capable of performing cooling and heating operations is known as a conventional air conditioner.

In the air conditioner shown in FIG. 6, reference numeral 1 denotes a variable-capacity compressor in an outdoor unit (ODU). Compressor 1 sequentially communicates with four-way valve 2, outdoor heat exchanger 3, and a decompressor, e.g., expansion valve 24, and with indoor heat exchanger 5 and the like in an indoor unit (IDU), thereby constituting the heat pump type refrigeration cycle.

According to such an air conditioner, in a cooling operation, a refrigerant is supplied in directions indicated by solid arrows in FIG. 6 to form a cooling cycle. In this case, outdoor and indoor heat exchangers 3 and 5 respectively serve as a condenser and an evaporator.

In a heating operation, a refrigerant is supplied in directions indicated by broken arrows in FIG. 6 upon switching operation of four-way valve 2 to form a heating cycle. In this case, indoor and outdoor heat exchangers 5 and 3 respectively serve as a condenser and an evaporator.

Compressor 1 receives operating power from inverter 6.

Outdoor fan 7 is arranged near outdoor heat exchanger 3.

Indoor fan 8 and indoor temperature sensor (inlet air temperature sensor) 9 are arranged near indoor heat exchanger 5. In addition, heat exchange temperature sensor 10 is arranged near indoor heat exchanger 5.

Furthermore, as shown in FIG. 7, outdoor unit ODU has inlet and outlet ports 12 and 13. Outdoor unit ODU draws outside air in through inlet port 12 upon operation of outdoor fan 7, and cools inverter 6 with part of the in-drawn air and heat-exchanges the residual of the drawn air by means of outdoor heat exchanger 3. Outdoor unit ODU then discharges the heat-exchanged air from outlet port 13.

During a cooling or heating operation, the output frequency (to be referred to as an operating frequency hereinafter) of inverter 6 is controlled in accordance with the difference between a preset indoor temperature and a temperature detected by indoor temperature sensor 9. With this operation, compressor 1 obtains an optimum capacity corresponding to an air-conditioning load. Hence, increased comfort of the user, as well as an energy saving effect can be achieved by the air conditioner.

Note that when the temperature of indoor heat exchanger 5 detected by heat exchange temperature sensor 10 exceeds a given value, which is set as an operating temperature of heat exchange temperature sensor 10 so as to keep the pressure of a high-pressure refrigerant below a predetermined value during a heating operation, the operating frequency of compressor 1 is gradually decreased, and at the same time, operation of outdoor fan 7 is immediately stopped. This control operation is called high-pressure protective release, and is an important function to prevent unnecessary interruptions of the compressor due to an abnormal increase in pressure of the high-pressure refrigeration side of a refrigeration cycle.

Outdoor fan 7, however, is also used to cool electric parts such as inverter 6 in outdoor unit ODU, as shown in FIG. 6. For this reason, if the above-described high-pressure protective release operation is prolonged and outdoor fan 7 does not resume operation, failures may occur in the electric parts such as inverter 6.

Such an arrangement, therefore, tends to degrade reliability of an air conditioner having a high-pressure protective release function, and hence is not preferable.

SUMMARY OF THE INVENTION

It is, therefore, an object of the present invention to provide a new and improved air conditioner with a function for protecting an electric circuit in an outdoor unit which can contribute to an increase in reliability by performing a reliable high-pressure protective release function without causing unnecessary interruptions of the compressor and failures in electric parts.

According to the present invention, there is provided an air conditioner comprising:

refrigeration cycle means, having high-pressure and low-pressure refrigerant sides, for causing at least a variable-capacity compressor and an outdoor heat exchanger both of which are arranged outside a room to be air-conditioned to communicate with an indoor heat exchanger arranged inside the room, the refrigeration cycle means being operated in a heating operation mode;

inverter means for generating an output having a predetermined operating frequency to be supplied to the variable-capacity compressor;

fan means for commonly supplying an air flow to the outdoor heat exchanger and the inverter means;

detecting means for detecting a signal corresponding to a pressure of a high pressure refrigerant side of the refrigeration cycle;

first control means for providing a command for causing the inverter means to gradually decrease the predetermined operating frequency when a detection signal from the detecting means exceeds a predetermined value; and second control means for monitoring a decrease in the predetermined operating frequency in the inverter means due to the first control means, and providing a stop command to the fan means when the predetermined operating frequency is deceased to a predetermined value or less.

According to the above-described arrangement of the present invention, when the pressure of the high-pressure side exceeds a predetermined value, a high-pressure protective release sequence is performed so as to decrease the operating frequency, thereby suppressing an abnormal increase in pressure of the high-pressure refrigeration side. However, if the operating frequency is decreased to a preset value upon high-pressure protective release, operation of the outdoor fan is stopped to increase suppression effect of the pressure of the high-pressure refrigeration side.

BRIEF DESCRIPTION OF THE DRAWINGS

These and other objects and features of the present invention can be understood through the following embodiments with reference to the accompanying drawings, in which:

FIG. 1 is a block diagram showing an arrangement of a refrigeration cycle and a control circuit according to an embodiment of the present invention;

DETAILED DESCRIPTION OF THE PREFERRED EMBODIMENTS

Figure 6:
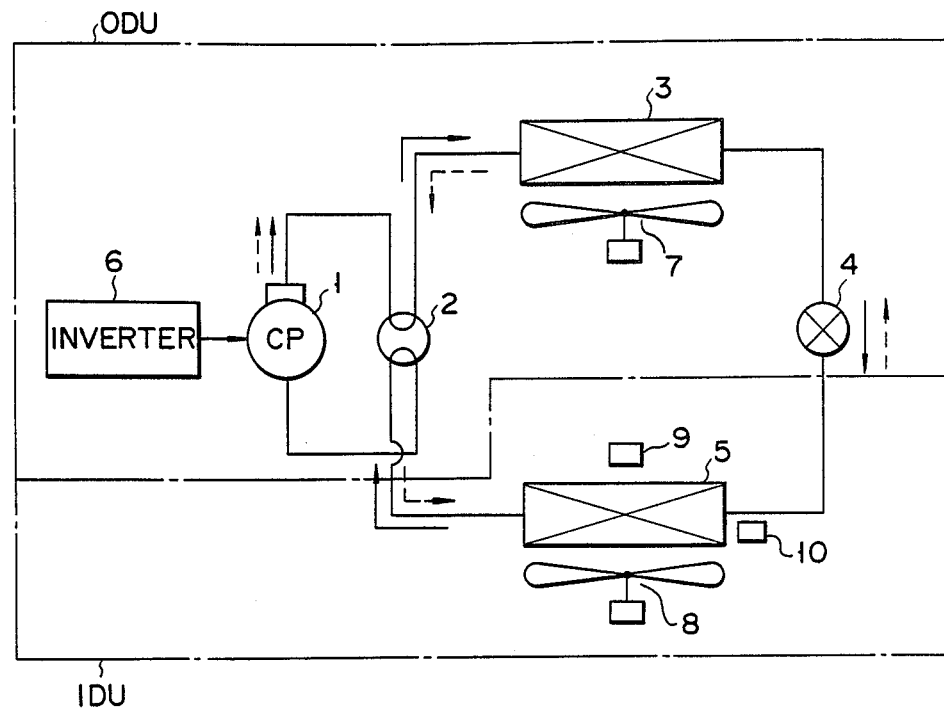
FIG. 6 is a block diagram showing an arrangement of a refrigeration cycle of a conventional air conditioner.

An embodiment of the present invention will be described below with reference to the accompanying drawings. Note that the same reference numerals in FIG. 1 denote the same parts as in FIG. 6, therefore a description of the latter will be omitted.

Figure 7:
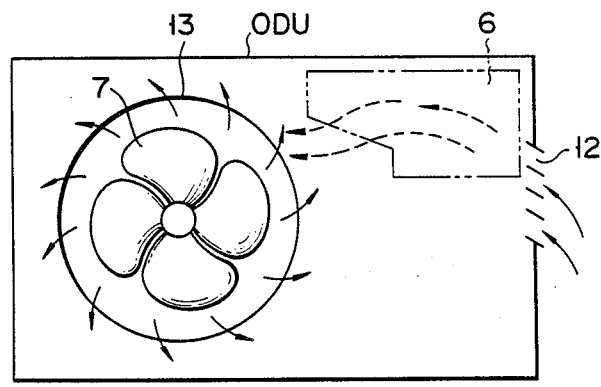
FIG. 7 is a schematic view showing an arrangement of an outdoor unit of the conventional air conditioner.

Outdoor unit ODU has substantially the same arrangement as that shown in FIG. 7. More specifically, in this embodiment, an arrangement shown in FIGS. 2A and 2B is employed for outdoor unit ODU.

Referring to FIG. 1, reference numeral 20 denotes a commercial AC power source, to which inverter 6 and control section 21 are connected.

Control section 21 controls the overall air conditioner including a high-pressure protective release function, and is mainly constituted by a microcomputer. Four-way valve 2, inverter 6, outdoor fan 7, indoor fan 8, indoor temperature sensor 9, heat exchange temperature sensor 10, and operation section 22 are all connected to control section 21. Operation section 22 comprises at least cooling/heating operation select key 22a, indoor temperature setting key 22b, and start key 22c.

Figure 2A:
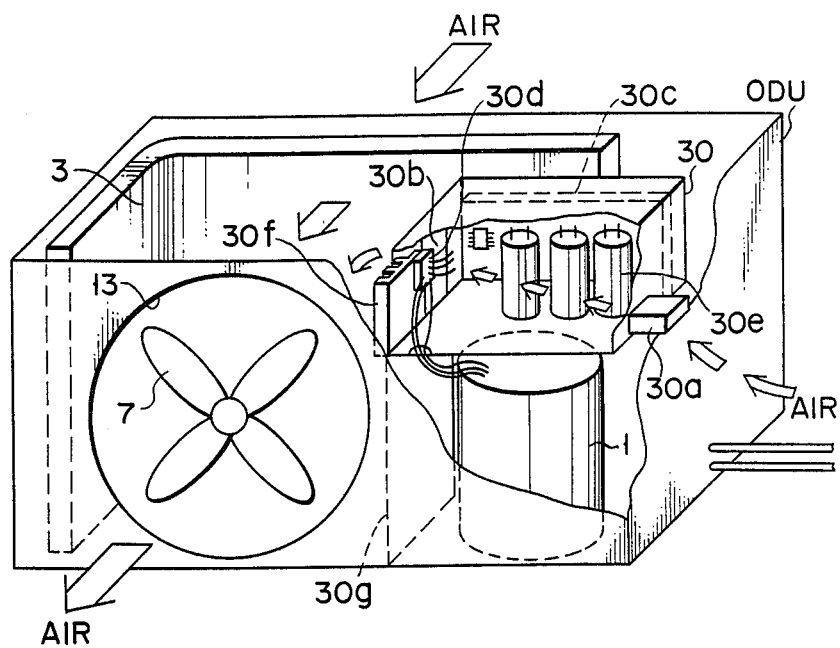
FIGS. 2A and 2B are a partially cutaway perspective view and a plan view showing a detailed arrangement of an outdoor unit used in the embodiment.
Figure 2B:
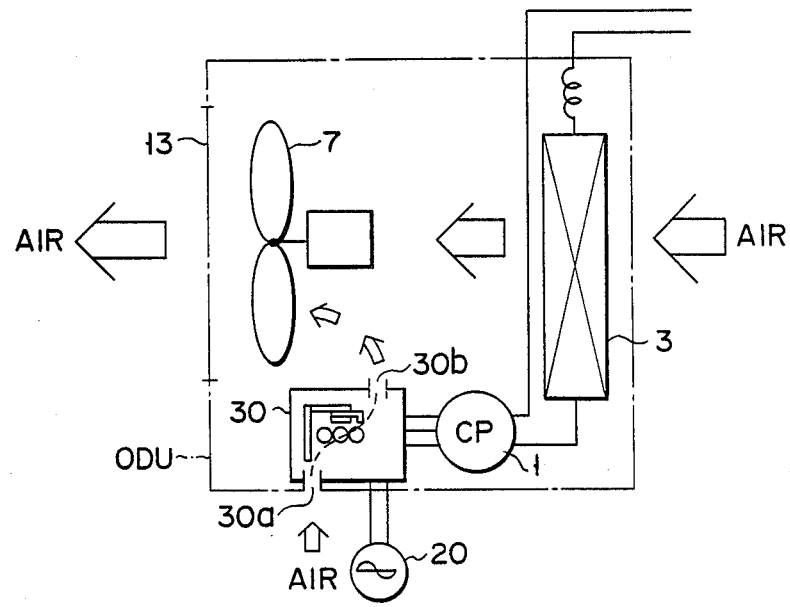

Referring to FIGS. 2A and 2B, reference numeral 30 denotes a housing box for inverter 6. Housing box 30 includes inlet port 30a for outside air and outlet port 30b opposing outdoor fan 7. Housing box 30 houses various electric parts including inverter transistors 30d and capacitors 30e mounted on printed circuit board 30c. Note that inverter transistors 30d are mounted on printed circuit board 30c through cooling plate 30f. Reference numeral 30g denotes a partition plate of outdoor unit ODU.

According to a characteristic feature of the present invention, a function for protecting the electric parts of inverter 6 is added to the air conditioner when the high-pressure protective release function is performed by control section 21.

Figure 3:
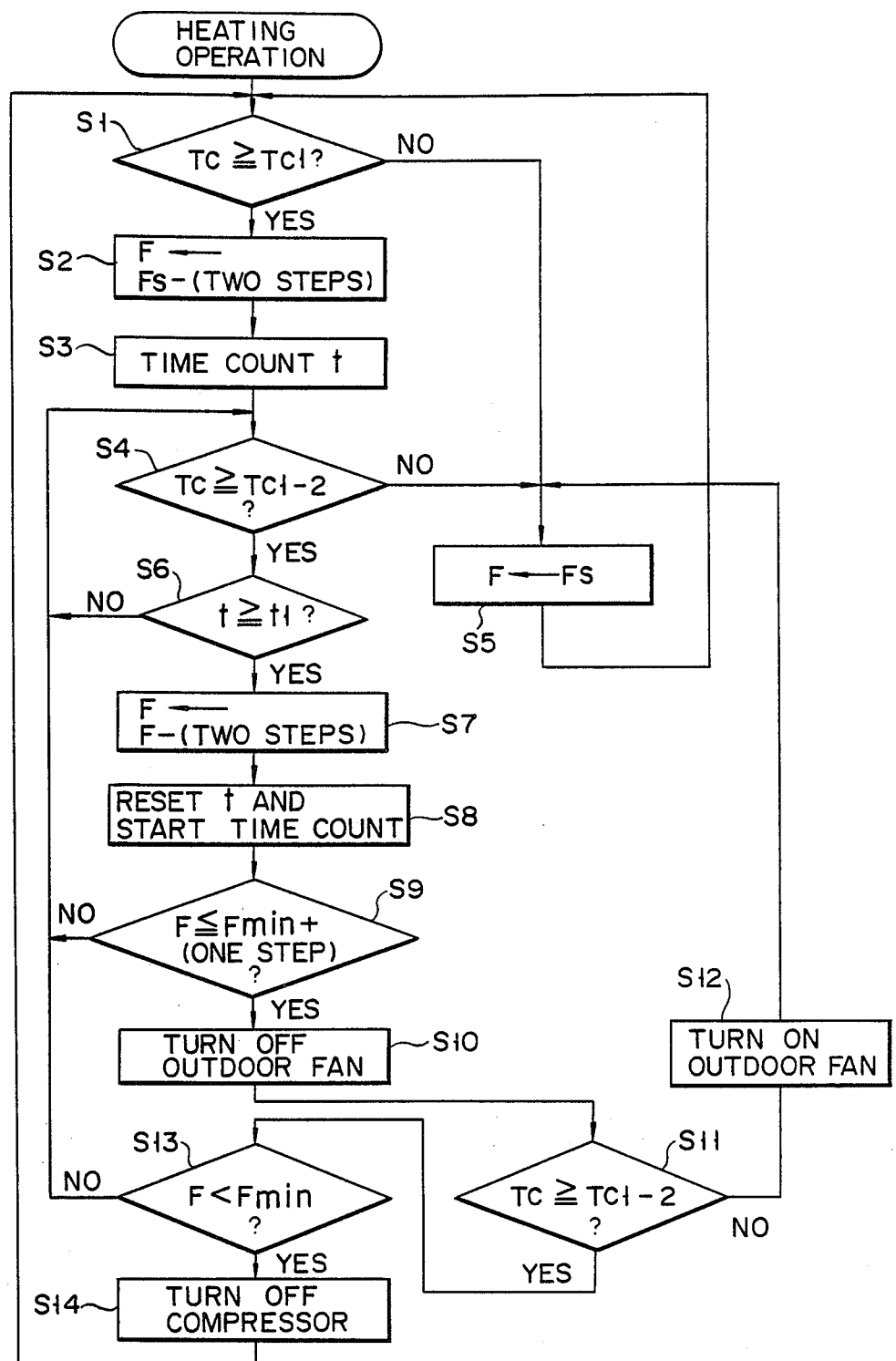
FIG. 3 is a flow chart for explaining an operation of the embodiment.
Figure 4:
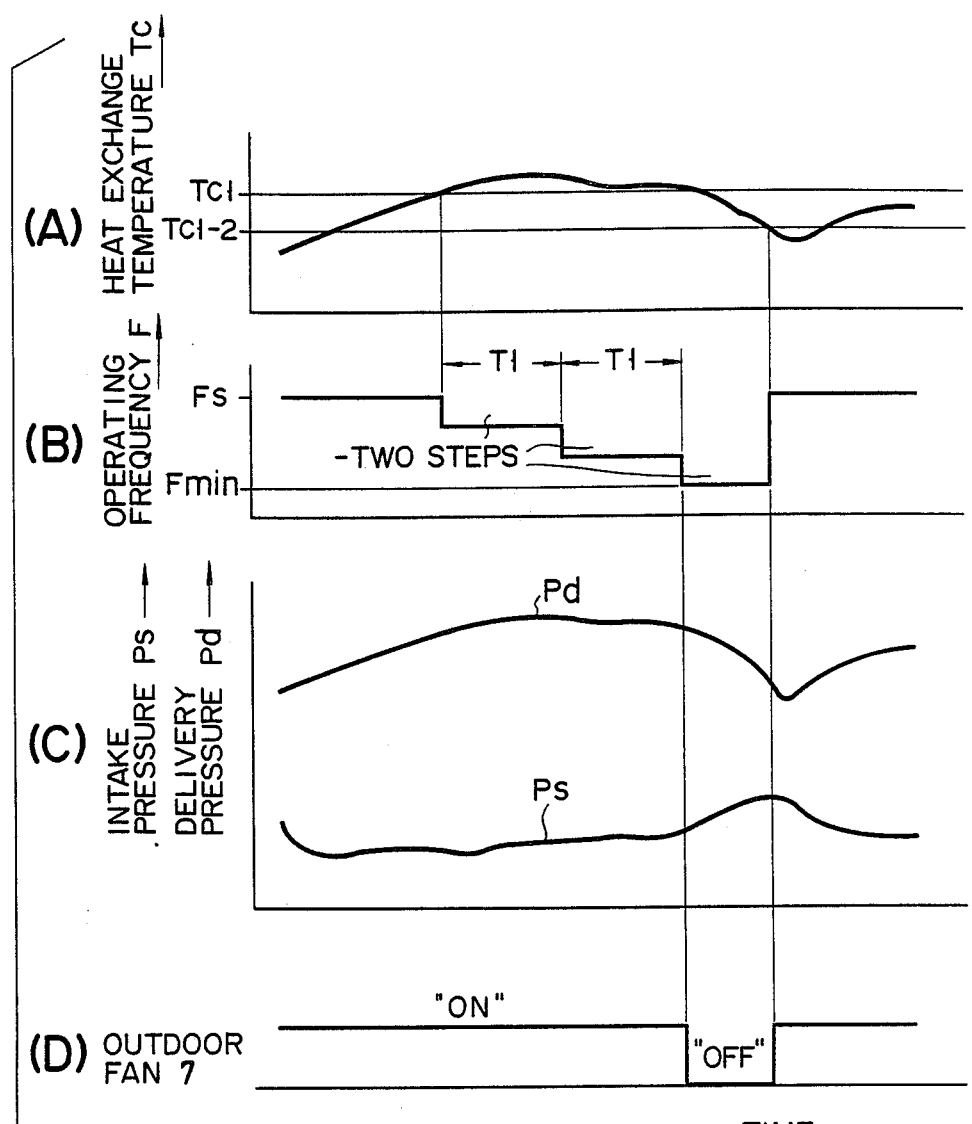
FIG. 4A to 4D are timing charts for explaining an operation of the embodiment.

An operation of the air conditioner having the above-described arrangement will be described below with reference to FIGS. 3 and 4.

A heating operation mode and a desired indoor temperature are set by keys 22a, 22b, and 22c of operation section 22. The operation of the air conditioner is then started.

Subsequently, control section 21 drives inverter 6, and at the same time, performs a switching operation of four-way valve 2. In addition, control section 21 starts outdoor and indoor fans 7 and 8.

When inverter 6 is operated, its output starts compressor 1. As a result, a heating cycle is formed.

During this heating operation, control section 21 calculates the difference between a temperature detected by indoor temperature sensor 9 and a preset indoor temperature, and sets operating frequency (an output frequency of inverter 6) F of compressor 1 to Fs corresponding to the calculated temperature difference.

Note that compressor 1 is designed to be operated with 15 steps of operating frequencies, each step being 5 Hz.

When the pressure of a high-pressure refrigerant is increased, temperature Tc of indoor heat exchanger 5 functioning as a condenser is also increased. This increase in temperature is detected by heat exchange temperature sensor 10.

When the pressure of the high-pressure refrigerant side is increased above a predetermined value (e.g., 25.6 kg/cm$^2$) and heat exchange temperature TC exceeds present value Tc1 (step S1 in FIG. 3), control section 21 performs high-pressure protective release so as to gradually decrease operating frequency F (steps S2 and S3). For example, this high-pressure protective release is performed so as to decrease operating frequency F of compressor 1 by two steps (10 Hz) every predetermined time interval t1 (e.g., 30 seconds).

When operating frequency F is decreased by this operation, delivery refrigerant pressure Pd of compressor 1 gradually decreases, whereas intake refrigerant pressure Ps increases, as shown in FIG. 4C.

When an abnormal increase in pressure of the high-pressure refrigerant side is suppressed by this high-pressure protective release, and heat exchange temperature Tc is decreased below a preset value (Tc1—2° C.) as shown in FIGS. 4A and 4B (step S4), control section 21 cancels the high-pressure protective release and returns operating frequency F to Fs, corresponding to the temperature difference (step S5).

If, however, the high-pressure protective release is continued for more than a predetermined time without a sufficient decrease in heat exchange temperature Tc, and operating frequency F is decreased to a predetermined value (minimum operating frequency Fmin+1 step), control section 21 stops the operation of outdoor fan 7, as shown in FIG. 4D (steps S6 to S10).

When the operation of outdoor fan 7 is stopped, suppression of the pressure of the high-pressure refrigerant side increases, and heat exchange temperature Tc is quickly decreased to a preset value (Tc1—2° C.).

When heat exchange temperature Tc is decreased below the preset value (Tc1—2° C.) in this manner, control section 21 cancels the high-pressure protective release, returns operating frequency F to Fs, which corresponds to the temperature difference, and resumes the operation of outdoor fan 7 (steps S11, S12→S5). In this case, control section 21 checks in step 13 if operating frequency F of compressor 1 is below minimum frequency Fmin so as to prevent an accident.

If the high-pressure protective release is continued for more than the predetermined time and operating frequency F decreases to the preset value, the operation of outdoor fan 7 is stopped in order to increase the effect of suppressing the pressure of the high-pressure refrigerant side in this manner. As a result, an abnormal increase in pressure of the high-pressure refrigerant can be reliably suppressed, and hence breakdown of compressor 1 can be prevented.

Normal operation can be restored by the time the high-pressure protective release operation reaches the final step (steps S13 and S14), i.e., before compressor 1 is stopped. Therefore, an unnecessary interruption can be prevented, ensuring the comfort of the user. In addition, since repetition of starting and stopping operations can be prevented, reliability can be increased and the service life of each refrigeration cycle device can be prolonged.

Furthermore, since outdoor fan 7 is not immediately stopped when high-pressure protective release is performed, unlike the conventional air conditioner, the cooling effect of the electric parts of inverter 6 can be maintained. Moreover, the output frequency of compressor 1 is set low while outdoor fan 7 is stopped, and generation of heat in inverter 6 is suppressed. Therefore, failures due to abnormal generation of heat in the electric parts of inverter 6 can be satisfactorily prevented.

Figure 5:
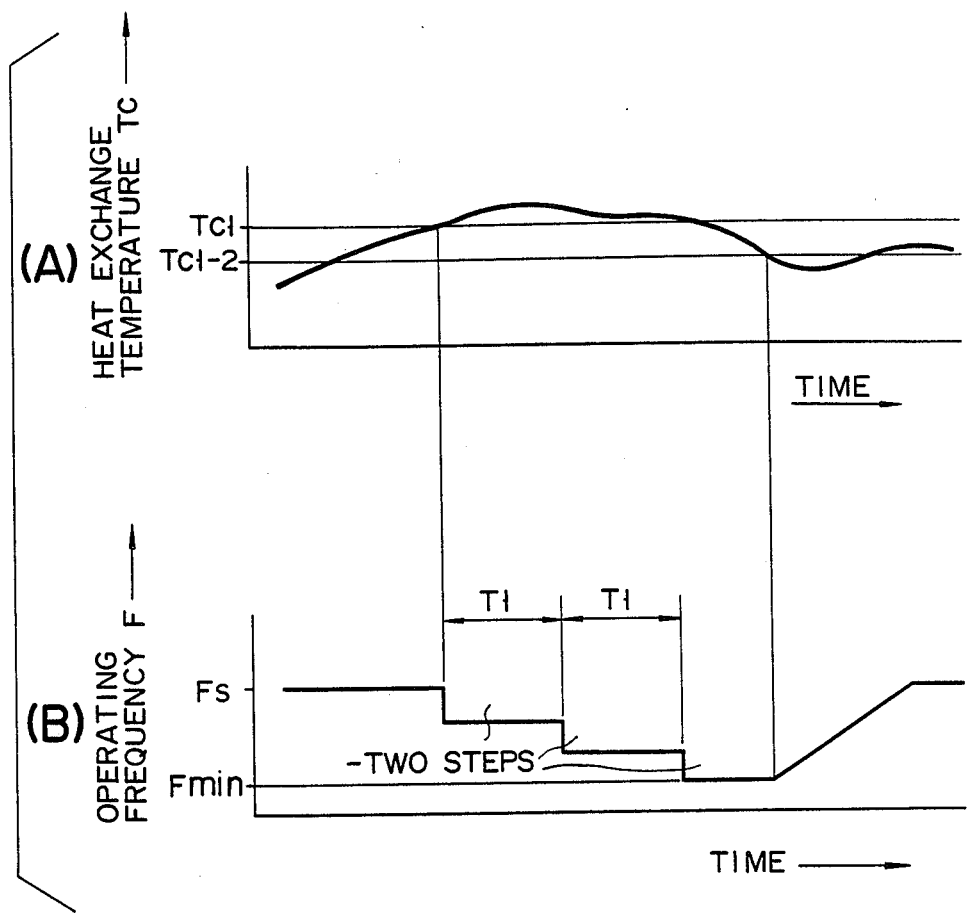
FIGS. 5A and 5B are timing charts for explaining an operation of a modification of the embodiment.

In the above embodiment, operating frequency F is quickly returned to Fs, corresponding to the temperature difference, upon cancellation of the high-pressure protective release. However, operating frequency F may be gradually returned to Fs at a speed (1 Hz/4 sec) of about 1/6 normal frequency rise speed, as shown in FIGS. 5A and 5B. With this operation, since operating frequency F can be controlled in accordance with a response characteristic of the refrigeration cycle, the frequency variation is minimal. As a result, a stable operating state of the refrigeration cycle can be obtained.

In addition, operating frequency F is decreased stepwise during high-pressure protective release. However, operating frequency F can also continuously decrease.

As has been described above, according to the present invention, the air conditioner comprises a heat pump type refrigeration cycle in which a compressor, a 4-way valve, an outdoor heat exchanger, a decompressor, and an indoor heat exchanger sequentially communicate with each other, a high-pressure protective release means for gradually decreasing the operating frequency of the compressor when the pressure of a high-pressure side of the refrigeration cycle exceeds a predetermined value, and a means for stopping the operation of the outdoor fan for blowing air to the outdoor heat exchanger when the operating frequency is decreased to a predetermined value during the high-pressure protective release. With this arrangement, a highly reliable air conditioner, which can perform a reliable protective operation against high pressure without causing unnecessary interruptions of the compressor and failures in the electric parts, is provided.

What is claimed is:
1. An air conditioner comprising:
    refrigeration cycle means, having high-pressure and low-pressure refrigerant sides, for causing at least a variable-capacity compressor and an outdoor heat exchanger, both of which are arranged outside a room to be air-conditioned, to communicate with an indoor heat exchanger arranged inside the room, said refrigeration cycle means being operated in a heating operation mode;
    inverter means for generating an output having a predetermined operating frequency to be supplied to said variable-capacity compressor;
    fan means for commonly supplying an air flow to said outdoor heat exchanger and said inverter means;
    detecting means for detecting a signal corresponding to the pressure of the high-pressure refrigerant side of said refrigeration cycle;
    first control means for providing a command for causing said inverter means to gradually decrease the predetermined operating frequency when a detection signal from said detecting means exceeds a predetermined value; and
    second control means for monitoring a decrease in the predetermined operating frequency in said inverter means due to said first control means, and providing a stop command to said fan means when the predetermined operating frequency is decreased to a predetermined value or less.

2. An air conditioner according to claim 1, wherein said air conditioner further comprises indoor temperature setting means for setting a temperature in the room to be air-conditioned; and
    an indoor temperature sensor for detecting a temperature in the room to be air-conditioned, and
    said first control means includes means for providing a command for causing said inverter means to set the predetermined operating frequency in accordance with a difference between a temperature set by said indoor temperature setting means and a detection temperature from said indoor temperature sensor.

3. An air conditioner according to claim 1, wherein said inverter means includes means for causing the predetermined operating frequency to correspond to a plurality of steps.

4. An air conditioner according to claim 3, wherein said first control means includes means for providing a command, as the command, for decreasing the predetermined operating frequency by a predetermined number of steps every unit time interval.

5. An air conditioner according to claim 1, wherein said detecting means includes a heat exchange temperature sensor for detecting a temperature of said indoor heat exchanger.

6. An air conditioner comprising:
    a heat pump type refrigeration cycle for causing a compressor, a four-way valve, an outdoor heat exchanger, a decompressor, and an indoor heat exchanger to sequentially communicate with each other;
    driving means for driving said compressor at a predetermined operating frequency;
    an outdoor fan for blowing air to said outdoor heat exchanger;
    first control means for monitoring the pressure of the high-pressure side of said refrigeration cycle, and executing high-pressure protective release for gradually decreasing the operating frequency of said compressor through said driving means when the pressure of the high-pressure side exceeds a predetermined value; and
    second control means for monitoring the operating frequency of said compressor during execution of the high-pressure protective release by said first control means and stopping operation of said outdoor fan when the operating frequency is decreased to a preset value or less.

7. An air conditioner according to claim 6, wherein said air conditioner further comprises indoor temperature setting means for setting a temperature in the room to be air-conditioned; and an indoor temperature sensor for detecting a temperature in the room to be air-conditioned, and said first control means includes mean for providing a command for causing said driving means to set the predetermined operating frequency in accordance with the difference between the temperature set by said indoor temperature setting means and a detected temperature from said indoor temperature sensor.

8. An air conditioner according to claim 7, wherein said driving means includes means for causing the predetermined operating frequency to correspond to a plurality of steps.

9. An air conditioner according to claim 8, wherein said first control means includes means for providing a command for decreasing the predetermined operating frequency by a predetermined number of steps every unit time interval during execution of the high-pressure protective release.

10. An air conditioner according to claim 6, wherein said first control means includes a heat exchange temperature sensor for detecting the temperature of said indoor heat exchanger so as to monitor the pressure of the high-pressure side.

* * * * *